June 2, 1953  C. A. SCHROEN  2,640,522
TRACTION ATTACHMENT FOR AUTOMOBILE WHEELS
Filed Sept. 20, 1950  2 Sheets-Sheet 1
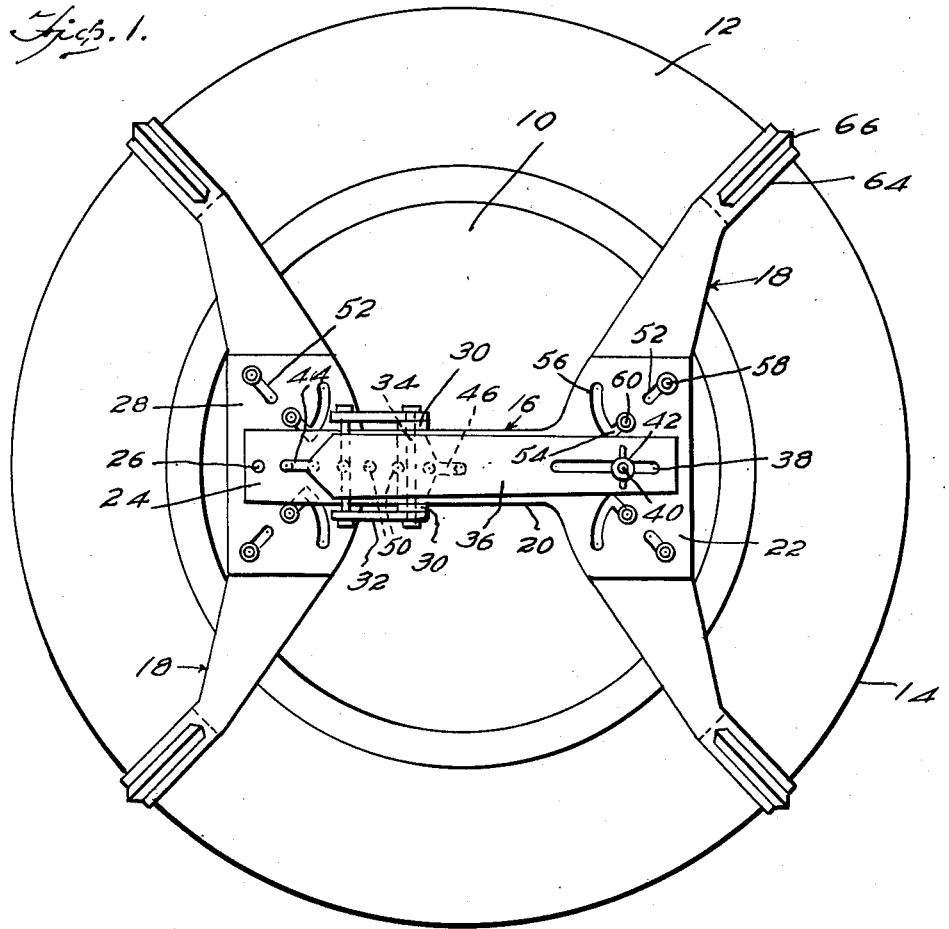
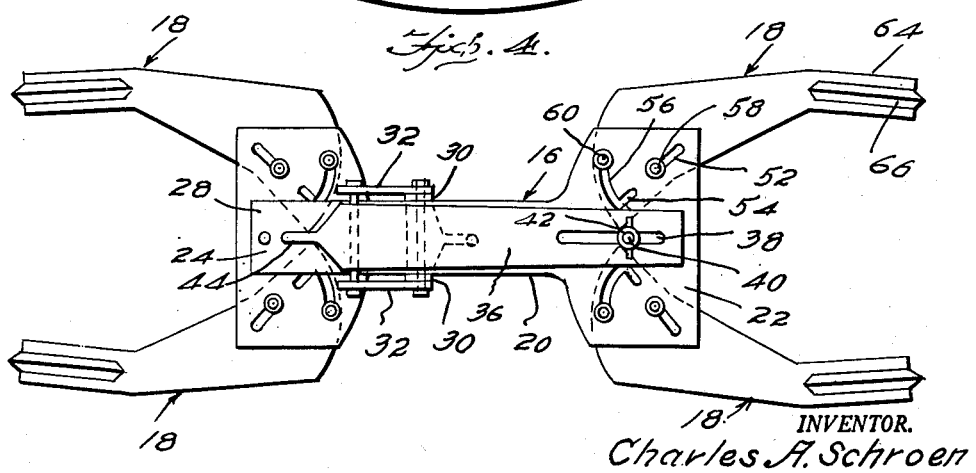
INVENTOR.
Charles A. Schroen
BY
Wilfred E. Lawson
ATTORNEY

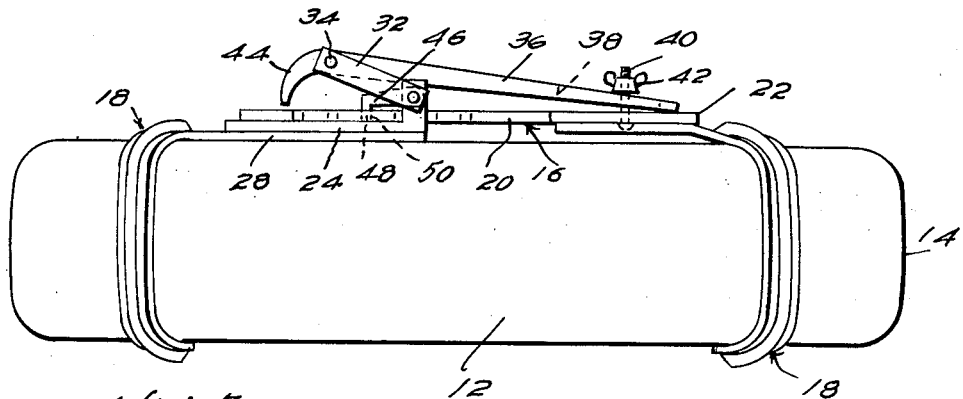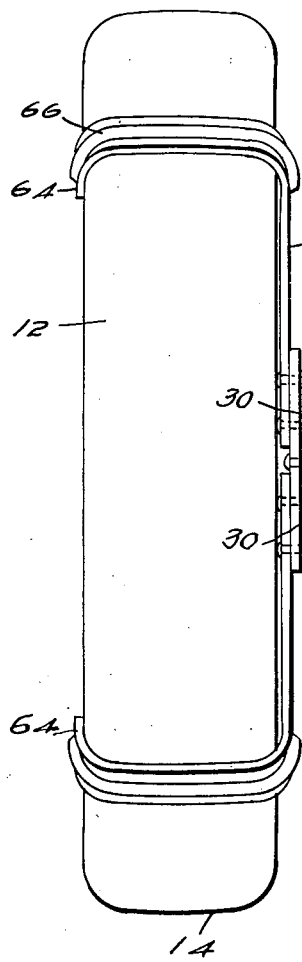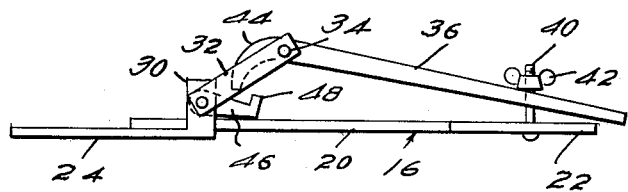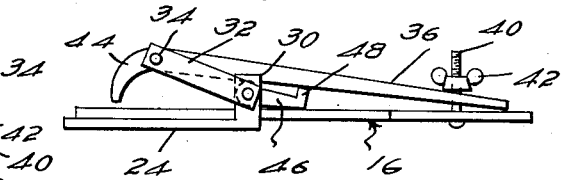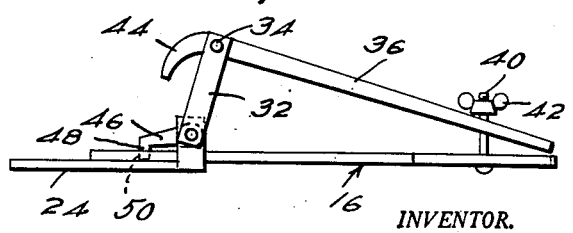

Patented June 2, 1953

2,640,522

UNITED STATES PATENT OFFICE 2,640,522

TRACTION ATTACHMENT FOR AUTOMOBILE WHEELS

Charles A. Schroen, Durango, Colo.

Application September 20, 1950, Serial No. 185,858

2 Claims. (Cl. 152—228)

This invention relates to a traction attachment for a vehicle tire and has for its primary object to improve the traction of a wheel particularly where it may have encountered a soft surface, such as snow or mud.

Another object is to enable the traction attachment to be applied to a vehicle wheel while said wheel is mired.

Still another object is to avoid the necessity of employing a jack or the like as is required when applying chains to vehicle tires.

The above and other objects may be attained by employing this invention which embodies among its features an extensible link carrying tire engaging traction hooks at opposite ends and means connected to the link for extending and retracting said link in order to move the traction hooks into and out of engagement with the vehicle tire.

Other features include an elongated tongue, a shoe mounted on said tongue for movement longitudinally thereof, links carried by the shoe for movement in arcuate paths on opposite sides thereof, a link pivotally connected to the links and adjustably connected to the tongue in order to effect relative movement between the tongue and shoe, and tire engaging traction hooks carried by the shoe and carried by the tongue for movement thereby into and out of engagement with a vehicle tire.

Still other features include means for coupling the traction hooks to the shoe and to the tongue for movement into and out of folded position for transportation and storage.

In the drawings:

Figure 1 is a side view of a vehicle wheel showing this improved traction attachment in place thereon;

Figure 2 is a top plan view of the vehicle wheel and attachment illustrated in Figure 1;

Figure 3 is an end view of the vehicle wheel and traction attachment illustrated in Figure 1;

Figure 4 is a side view of the traction attachment in its folded position;

Figure 5 is an enlarged edge view of the extensible link of the traction attachment with the traction hooks omitted, showing the extensible link in extended position;

Figure 6 is a view similar to Figure 5 showing the link in retracted position; and Figure 7 is a view similar to Figure 5 showing the adjusting hook in operative position for holding the parts against movement while adjustment of the length of the link is being made.

Referring to the drawings in detail a vehicle wheel 10 is equipped with a conventional tire 12 having a conventional tread 14 about which the traction hooks of this attachment are engaged.

The traction attachment above referred to comprises an extensible link designated generally 16 carrying at opposite ends traction hooks designated generally 18.

The extensible link 16 comprises an elongated tongue 20 having a head 22 at one end thereof and mounted for longitudinally sliding movement on said tongue 20 is a shoe 24 to which is attached in any suitable manner as by rivets 26 a head 28. Extending perpendicularly from the shoe 24 on opposite sides and adjacent one end thereof are ears 30 to which are pivotally connected for movement in arcuate paths on opposite sides of the shoe 24 links 32. Carried by the links 32 and extending therebetween remote from their pivotal connection to the ears 30 is a pivot pin 34 to which is pivotally connected adjacent one end an elongated link 36. Formed in the elongated link 36 adjacent its end remote from the pivot 34 is an elongated longitudinal slot 38 for the reception of a bolt 40 carried by the tongue 20. As illustrated in the drawings the bolt 40 is equipped with a wing nut 42 which serves to clamp the link 36 against the tongue 20 to prevent relative movement therebetween. A hook-shaped finger hold or grip 44 is carried by the end of the link 36 adjacent the pivot 34 in order to facilitate the extension and contraction of the extensible link 16.

In order to hold the parts against relative movement during the adjustment of the link 36 on the tongue 20, I mount for movement in an arcuate path between the ears 30 a hook 46 carrying a perpendicularly extending lug 48 which when in the position illustrated in Figure 7 enters into an opening 50 of a row of longitudinally spaced openings formed in the tongue 20.

Formed in each head 22 and 28 adjacent the ends thereof remote from the link 16 are diagonally disposed slots 52 which align with diagonally disposed slots 54. The slots 54 have communicating therewith adjacent the ends thereof remote from the slots 52 outwardly extending radial slots 56. These slots receive guide pins 58 and 60 respectively carried by arms 62 of the traction hooks 18. The ends of the arms 62 remote from those carrying the pins 58 and 60 are provided with tire engaging hooks 64 which as illustrated in Figures 2 and 3 extend downwardly on the inside of a tire for a distance sufficient to assure firm gripping engagement with the tire when the device is in place thereon. Each of the hooks 64 is provided with an outwardly extending rib 66 which is adapted to bite into the soft surface encountered by the tire and assist in establishing proper traction for extracting a vehicle that may have become mired.

As illustrated in Figure 4, the traction hooks 18 may be folded by moving the pins 58 and 60 in the respective slots 52 and 54 until the pin 60 of each hooks reaches the inner end of its respective slot 54 at which time the hook 18 may be moved about the axis of the pin 58 with the pin 60 moving into the arcuate slot 56. In this way the width of the device may be materially reduced for transportion and storage.

When it is desired to place the device in service, it is removed from the storage compartment of the vehicle and the traction hooks 18 are extended by moving them outwardly about the axes of the pivots 58 until the pins 60 are free to move in the diagonal slots 54 at which time the traction hooks 18 are moved diagonally outwardly and with the link 16 extended as illustrated in Figure 6, the hooked ends of the hook members are advanced across the tread 14 of the tire 12 into the position illustrated in Figures 1 and 3. Upon grasping the hook 44 of the link 36 and moving the links 32 about their pivotal connection with the ears 30, it is evident that the link 16 may be contracted to bring the hooks 64 into engagement with the tire tread 14. By thus bringing the hook members 64 of the traction hooks 18 into tire embracing position, it will be evident that the device will be firmly held in place. In order to effect proper adjustment of the link 36 with relation to the tongue 20, the device is placed on a tire in a position so that the hook members 64 of the traction hooks 18 are in embracing position with the tread 14 and the hook member 46 is moved about its pivotal connection with the shoe 24 until the lug 48 enters one of the openings 50. The links 32 are then moved about their pivotal connection with the ears 30 until the proper position is attained whereupon the bolt 40 is passed through the slot 38 in the link 36 and upon tightening the wing nut 42 it will be evident that the proper relationship between the tongue 20 and link 36 will be effected. When the hook member 46 is not in use it is thrown over into the position substantially as illustrated in Figures 5 and 6.

While in the foregoing there has been shown and described the preferred form of this invention, it is to be understood that minor changes in the details of construction, combination and arrangement of parts may be resorted to without departing from the spirit and scope of the invention as claimed.

I claim:

1. In a traction attachment for an automobile wheel provided with a tire, a pair of relatively adjustable elongated members, a transversely disposed rectangular head plate at the outer end of each of said members, each plate being provided with a pair of outer transversely spaced and oppositely angled straight slots and a pair of inner companion arcuate slots, a pair of tire engaging hooks having inwardly extending elongated arms projecting angularly outward from the opposite ends of each head plate, a pair of guide pins carried by each of the arms and engaged in the companion of the said straight and arcuate slots, and means for effecting the endwise adjustment of the members to engage the hooks with or to release the same from the tire, said hooks being outwardly ribbed to increase the traction effect of the same.

2. The invention as defined in claim 1, with the said members comprising flat bars disposed in endwise overlapping relation, ears upturned from the opposite sides of the inner end of the lower of the bars, a dog pivoted in and between the ears in overlying relation with respect to the inner end of the upper of the bars, said upper bar having a series of spaced apertures to be selectively engaged by the dog, a lever overlying the upper bar and adjustably connected thereto adjacent its outer end, links having one of their ends pivoted on the supporting pivots of the dog at the outer sides of the ears and having their other ends pivoted to the side edges of the lever adjacent its inner end, and means for securing the outer end of the lever to retain the same against accidental displacement when the inner end portion thereof is disposed in close overlying relation with respect to the dog to hold the same engaged with one of the said apertures.

CHARLES A. SCHROEN.

References Cited in the file of this patent

UNITED STATES PATENTS

| Number | Name | Date |
|---|---|---|
| 2,510,451 | Williams | June 6, 1950 |